United States Patent
Mongeau et al.

(10) Patent No.: US 8,856,580 B2
(45) Date of Patent: Oct. 7, 2014

(54) CONTROLLER ELECTION

(75) Inventors: Yves Mongeau, Laval (CA); Richard H. Blanchette, Hopkinton, MA (US)

(73) Assignee: Hewlett-Packard Development Company, L.P., Houston, TX (US)

(*) Notice: Subject to any disclaimer, the term of this patent is extended or adjusted under 35 U.S.C. 154(b) by 169 days.

(21) Appl. No.: 13/081,934

(22) Filed: Apr. 7, 2011

(65) Prior Publication Data

US 2012/0260120 A1    Oct. 11, 2012

(51) Int. Cl.
*G06F 11/00* (2006.01)
*H04L 29/14* (2006.01)
*G06F 11/07* (2006.01)

(52) U.S. Cl.
CPC ............ *H04L 69/40* (2013.01); *G06F 11/0793* (2013.01)
USPC ................. 714/4.11; 714/4.1; 714/2

(58) Field of Classification Search
CPC .......................... G06F 11/0793; G06F 11/1008
USPC ............................................. 714/30, 25, 4.11
See application file for complete search history.

(56) References Cited

U.S. PATENT DOCUMENTS

| | | | | |
|---|---|---|---|---|
| 6,014,686 A * | 1/2000 | Elnozahy et al. | ............. | 709/202 |
| 7,127,633 B1 * | 10/2006 | Olson et al. | ................... | 714/4.4 |
| 7,757,115 B2 * | 7/2010 | Shibayama et al. | ............ | 714/12 |
| 7,949,893 B1 * | 5/2011 | Knaus et al. | ................... | 714/4.1 |
| 2007/0294563 A1 * | 12/2007 | Bose | .................. | 714/5 |
| 2008/0022148 A1 * | 1/2008 | Barnea et al. | ..................... | 714/5 |
| 2010/0315945 A1 * | 12/2010 | Matuszewski et al. | ........ | 370/221 |
| 2012/0257603 A1 * | 10/2012 | Mercier | ......................... | 370/338 |

* cited by examiner

*Primary Examiner* — Sarai Butler

(57) ABSTRACT

A method of controller election includes, upon failure of a master controller within a team comprising a number of controllers, automatically promoting another of the number controllers to serve as an elected master controller and designating the elected master controller as a new master controller if it is determined that the failure of the master controller is not temporary.

17 Claims, 7 Drawing Sheets

CONTROLLER ELECTION

BACKGROUND

Computer networks provide a number of users operating computer devices the ability to communicate with other computing devices connected to that network. A wireless network further offers the benefit of communication without cables between the various access points and the individual systems accessing that network. Implementing a wireless network avoids the costly process of having to install cables and equipment in a building where the network would operate. Additionally, this avoids the need for a user to be stationed in a permanent location while gaining access to the network.

However, some components of a wired or wireless network may, at times, fail temporarily or permanently due to manufacturing defects or operator errors. One example of a component that might fail is a controller. A controller is a device within a wired or wireless computer network that performs automatic adjustments to radio frequency (RF) power, channels, authentication, and security. The controller further configures and manages access points (APs) which may allow a user of a computing device to access the network. If the controller fails, at least some portion of the network is rendered inoperable. Consequently, if a portion of the computer network is rendered inoperable, then the entity or business that utilizes the computer network will experience a decrease in productivity and efficiency.

BRIEF DESCRIPTION OF THE DRAWINGS

The accompanying drawings illustrate various examples of the principles described herein and are a part of the specification. The illustrated examples are merely examples and do not limit the scope of the claims.

Throughout the drawings, identical reference numbers designate similar, but not necessarily identical, elements.

DETAILED DESCRIPTION

Figure 1:
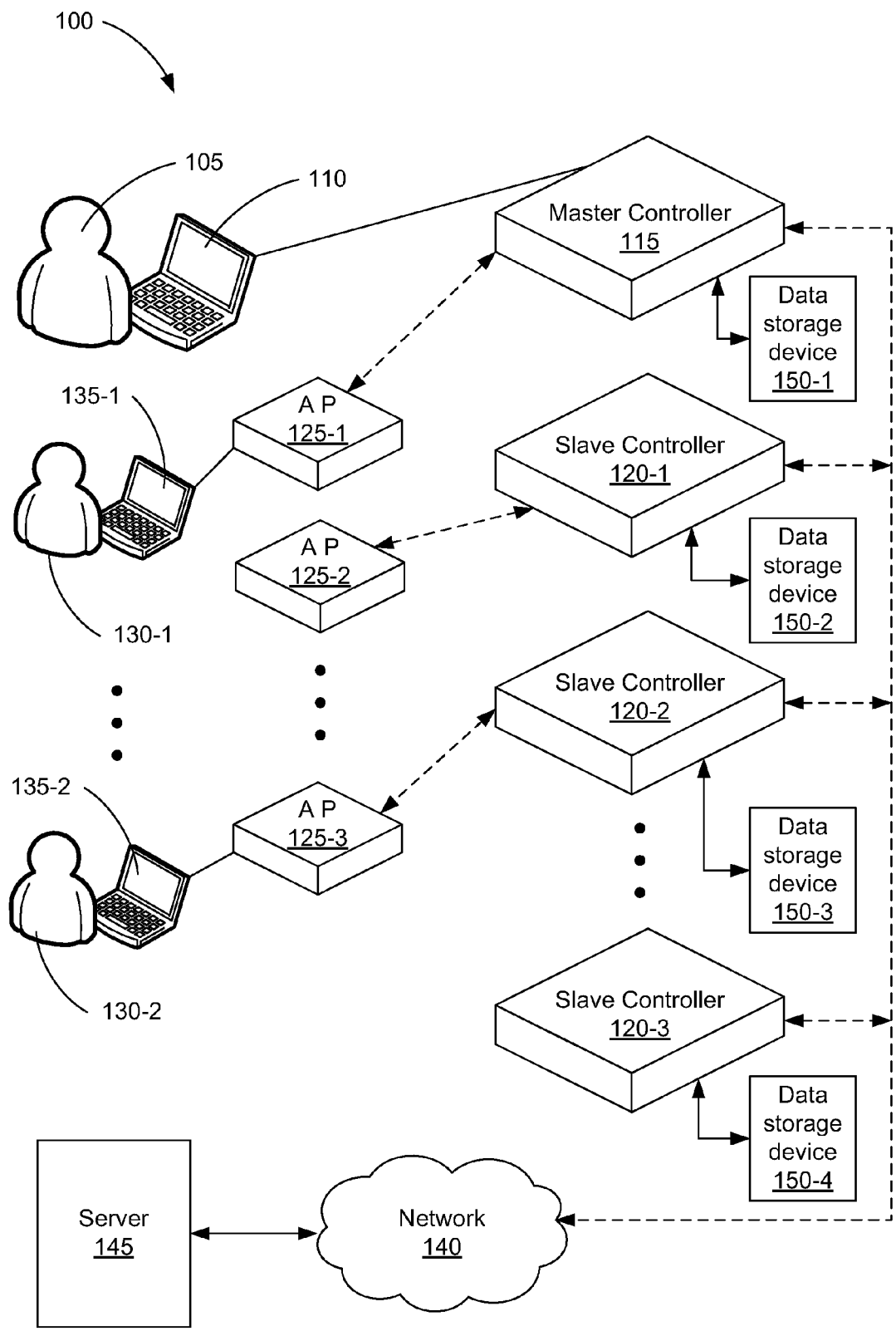
FIG. 1 is a diagram of an illustrative system for configuring and electing a controller within a network to be a master controller, according to one example of principles described herein.

The present specification discloses systems and methods of dealing with the failure of a master controller within a team of controllers. Upon failure of a master controller device, another controller device is automatically elected as an elected master controller giving the ability for the network administer to access the team of controllers and address the failure of the master controller. However, the network administrator may be prevented from configuring any settings on the elected master controller or any other controller until either the original master controller rejoins the team or the failure of the master controller is deemed permanent and the elected master is promoted to be the new master controller. Thus, any synchronization issues may be handled by the new master controller in a deterministic and easy to understand fashion.

As briefly discussed above, various components of a network may fail either do to manufacturing defects, user errors or other circumstances which may be experienced in a computer network. One of these devices may be a controller which has been teamed with a group of other controllers. Teaming of controllers enables an authorized administrator to easily configure and monitor multiple controllers and the respective access points that each controller supports, thereby providing a number of benefits. Some of these benefits may include centralized management and monitoring, service scalability, and redundancy in cases where a controller may fail.

In the case of redundancy, if one of the controllers in a team becomes inoperative, its access points (APs) may automatically look to migrate to another controller in the team so that these access points may continue to provide services to those users accessing the network. However, for this to work, sufficient capacity must be available on the remaining controllers in the team to support those additional access points (APs) migrating from the inoperative controller.

Additionally, if a controller were to fail, the ability of an administrator to configure and monitor the rest of the controllers as well as their respective access points (APs) may be limited or completely lost. Therefore, the present specification discloses a configuration system and method of promoting a slave controller, which, after failure of the master controller, provides for that controller's status to be upgraded to an elected master controller status. Consequently, the network administrator may then be able to view the network's configuration status and monitor the remaining units in the controller group instead of loosing all ability to access the group of controllers. This all may be done while a determination is being made by the administrator as to whether the failed master controller will be available in the future or whether the elected master controller is to be upgraded to the status of master controller.

If the network administrator has determined that the failure of the master controller is permanent, the administrator may then choose to upgrade the elected master controller to a master controller and then be able to configure the group of controllers once again. However, if the network administrator determines that the failure of the master controller is temporary, then the network administrator may investigate how to bring the failed master controller back on line and join the group again. If the network administrator successfully brings the failed master controller back on-line, then the elected master may then be downgraded to the status of a slave controller once again and the once failed master controller regains control of the entire group of controllers. The network administrator is then allowed to configure the group of controllers once again and have the configuration settings pushed down to each of the slave controllers and their respective access points.

In the following description, for purposes of explanation, numerous specific details are set forth in order to provide a thorough understanding of the present systems and methods. It will be apparent, however, to one skilled in the art that the present apparatus, systems and methods may be practiced without these specific details. Reference in the specification to "an example" or similar language means that a particular feature, structure, or characteristic described in connection with an example is included in at least that example, but not necessarily in others.

As used in the present specification and in the appended claims the term "controller" is meant to be understood as any device that coordinates and controls the operation of one or more input/output devices and synchronizes the operation of such devices within the operation of a computer network. For example, a controller may be a blade unit, a personal computer, or some other stand-alone appliance device. Additionally, with regard to a wireless access point, the controllers may perform automatic adjustments to radio frequency (RF) power, channels, authentication, and security.

Additionally, as used in the present specification and in the appended claims the term "administrator" or "network administrator" is meant to be understood broadly as any person responsible for administrative tasks such as access authorization, content management, and configuration of a group of components within a network including, but not limited to, a controller. "Administrators" may also oversee the synchronization of the various controllers and access points in a computer network and may further have the ability to change the status level of any individual controller on a wireless network.

Turning now to the figures, FIG. 1 is a diagram of an illustrative system (100) for configuring and electing a controller (115, 120-1, 120-2, 120-3) within a network (140) to be a master controller (115), according to one example of principles described herein. As briefly discussed above the system (100) is composed of a number of wired or wireless components. Examples of wireless components may include any device that is capable of sending and receiving wireless communications to or from the network (140). Particular examples may include, but are not necessarily limited to, desktop computers, laptop computers, mobile phones, or an access point (125-1, 125-2, 125-3). Examples of wired components may also include any device that is capable of sending and receiving wired communications to or from the network (140) over some cable. Particular examples of wired components may also further include, but may not necessarily be limited to desktop computers, laptop computers, controllers (115, 120-1, 120-2, 120-3), access points (125-1, 125-2, 125-3) or a servers (145). Therefore, as depicted in FIG. 1, the individual components may send and receive communications to or from each other either wired or wirelessly. However, as depicted in FIG. 1 and for purposes of simplicity, the individual components will be described as being wired components.

The system (100) may include, a group of controllers (115, 120-1, 120-2, 120-3) communicatively coupled to a network (140), a number of servers (145) located within or accessible through that network, a number of access points (125-1, 125-2, 125-3) communicatively coupled to the group of controllers (115, 120-1, 120-2, 120-3), and a number of wired or wireless client computing devices (135-1, 135-2) in communication with one of the access points (125-1, 125-2, 125-3). Each of these components will now be described in more detail.

Acting as intermediary devices between the computing devices (135-1, 135-2) and the controllers (115, 120-1, 120-2, 120-3), the access points (125-1, 125-2, 125-3) allow the computing devices (135-1, 135-2) to connect to the network (140). The access points (125-1, 125-2, 125-3) may communicate wirelessly with the computing devices (135-1, 135-2) using, for example, IEEE 802.11 standards (developed by Wi-Fi Alliance® (commonly referred to as Wi-Fi®)), or IEEE 802.15 standards (developed by Bluetooth Special Interest Group (commonly referred to as Bluetooth®)), among others.

Each access point (125-1, 125-2, 125-3) is communicatively coupled to one of the controllers (115, 120-1, 120-2, 120-3) and can relay data between the computing devices (135-1, 135-2) and wired devices on the network (140) such as, for example, the server (145). In another example, the access points (125-1, 125-2, 125-3) communicate with the computing devices (135-1, 135-2) through a wired system such as, for example, an Ethernet connection (standardized as IEEE 802.3) or a fiber optic connection (standardized as IEEE 802.8), among other standards.

The access points (125-1, 125-2, 125-3) are managed by a group of controllers (115, 120-1, 120-2, 120-3). The controllers (115, 120-1, 120-2, 120-3) may configure and manage RF power, channels, authentication, and security used within the system (100). As previously mentioned, the group of controllers (115, 120-1, 120-2, 120-3) form a team. Among the members of the team, one controller may be assigned as the master controller (115), and the other controllers are initially assigned as slave controllers (120-1, 120-2, 120-3). Each controller (115, 120-1, 120-2, 120-3) includes a processor used to perform at least the function of creating and propagating configurations for a number of access points (125-1, 125-2, 125-3) and controllers (115, 120-1, 120-2, 120-3) as will be discussed in more detail below.

Although four controllers (115, 120-1, 120-2, 120-3) are depicted in FIG. 1, any number of controllers may be included within the system (100) with any number of access points (125-1, 125-2, 125-3) communicatively coupled to each controller (115, 120-1, 120-2, 120-3). For example, any number of slave controllers (120-1, 120-2, 120-3) may be included in addition to the master controller (115). Further, any number of access points (125-1, 125-2, 125-3) may be communicatively coupled to each controller (115, 120-1, 120-2, 120-3). For example, as depicted in FIG. 1, two slave controllers (120-1, 120-3) each have a respective access point (125-2, 125-3) communicatively coupled thereto. However, any number of access points (125-1, 125-2, 125-3) may be in communication with each slave controller (120-1, 120-2, 120-3). Further, as depicted in FIG. 1, the master controller (115) has one access point (125-1) communicatively coupled thereto. However, any number of access points (125-1, 125-2, 125-3) may be serviced by the master controller (115).

The controllers (115, 120-1, 120-2, 120-3) may each include a data storage device (150-1, 150-2, 150-3, 150-4) for storing configuration data as will be discussed in more detail below. In the present example, for the purposes of simplicity in illustration, the data storage devices (150-1, 150-2, 150-3, 150-4) are separate computing devices communicatively coupled to each respective controller (115, 120-1, 120-2, 120-3). However, the principles set forth in the present specification extend equally to any alternative configuration in which a controller (115, 120-1, 120-2, 120-3) and a data storage device (150-1, 150-2, 150-3, 150-4) are each implemented by a single computing device. The data storage devices (150-1, 150-2, 150-3, 150-4) may be various types of memory modules, including volatile and nonvolatile memory that store the configuration data relating to the access points (125-1, 125-2, 125-3) and the controllers (115, 120-1, 120-2, 120-3) themselves. For example, the data storage devices (150-1, 150-2, 150-3, 150-4) of the present example may include Random Access Memory (RAM), Read Only Memory (ROM), Hard Disk Drive (HDD) memory, and combinations of these. Many other types of memory are available, and the present specification contemplates the use of many varying types of memory in the data storage devices (150-1, 150-2, 150-3, 150-3, 150-4) as may suit a particular application of the principles described herein. In certain examples, different types of memory in the data storage devices (150-1, 150-2, 150-3, 150-4) may be used for different data storage needs.

Generally, data storage devices (150-1, 150-2, 150-3, 150-4) may include a computer readable storage medium. For example, the data storage devices (150-1, 150-2, 150-3, 150-4) may be, but are not limited to, an electronic, magnetic, optical, electromagnetic, infrared, or semiconductor system, apparatus, or device, or any suitable combination of the foregoing. More specific examples of the computer readable storage medium may include, for example, the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device such as, for example, a processor. In one example, the data storage devices (150-1, 150-2, 150-3, 150-4) are non-transitory data storage media.

The client computing devices (110, 135-1, 135-2) may, as mentioned, be either wired or wireless. Additionally, the computing devices (110, 135-1, 135-2) may also include a computer readable storage medium as defined above. The computing devices (110, 135-1, 135-2) each include a number of ports through which the computing devices (110, 135-1, 135-2) communicate with other network elements. The ports may be serial or parallel ports including, but not limited to, a USB port, and an IEEE-1394 port.

The system (100) also includes a network (140) to which the computing devices (135-1, 135-2) gain access through the access points (125-1, 125-2, 125-3) and controllers (115, 120-1, 120-2, 120-3). The network (140) may be any network, including, for example, a local area network (LAN), a wide area network (WAN), a virtual private network (VPN), and the Internet, among others. The network (140) provides the wired and/or wireless computing devices (110, 135-1, 135-2) with access to the server (145). In one example, the server (145) is a web server located within, for example, the Internet. In such an example, the computing devices (110, 135-1, 135-2) request data from the server (145) over the network (140) using the appropriate network protocol (for example, Internet Protocol ("IP")).

As depicted in FIG. 1, the computing devices (135-1, 135-2) may be operated by a number of users (130-1, 130-2). Certain users may be given administrative rights to configure the system (100) along with the administrator (105). In one example, however, the administrator (105) may be the sole person who is given the authority to configure the various settings of the controllers (115, 120-1, 120-2, 120-3) and access points (125-1, 125-2, 125-3). Specifically, the administrator (105) may be the sole person to whom is given the authority to team the controllers (115, 120-1, 120-2, 120-3) together, select a master controller (115) out of the number of teamed controllers (115, 120-1, 120-2, 120-3), generate configuration settings for the individual controllers (115, 120-1, 120-2, 120-3) and access points (125-1, 125-2, 125-3), propagate those configuration settings throughout the team of controllers (115, 120-1, 120-2, 120-3) and access points (125-1, 125-2, 125-3), and, when appropriate, promote an elected controller (FIG. 2, 210-1') as the groups new master controller. Promotion of an elected controller (FIG. 2, 210-1') to a master controller (115) will be discussed later in connection with FIG. 2.

As will be discussed in more detail in connection with FIG. 5, the administrator is first responsible for teaming a group of controllers (115, 120-1, 120-2, 120-3) together and choosing amongst those controllers (115, 120-1, 120-2, 120-3) a master controller (115). It is through the master controller (115) that the administrator configures the rest of the controllers (120-1, 120-2, 120-3). The administrator (105) may therefore direct a computing device (110) to send, for example, a Simple Object Access Protocol (SOAP) message to the master controller (115), upon which the master controller (115) may push those configuration settings and data to the slave controllers (120-1, 120-2, 120-3) that have been teamed with the master controller (115). In this way, the administrator (105) may configure all the controllers (115, 120-1, 120-2, 120-3) within the network (140) through a single controller (115) without having to configure each controller (115, 120-1, 120-2, 120-3) individually. Additionally, because the controllers (115, 120-1, 120-2, 120-3) are in communication with their respective access points (125-1, 125-2, 125-3) the configuration is also propagated to them once their respective controller (115, 120-1, 120-2, 120-3) has obtained the configuration.

The administrator (105) may access the team of controllers (115, 120-1, 120-2, 120-3) through an appropriate computing device (110). In order to simplify access to the team of controllers (115, 120-1, 120-2, 120-3), a single Internet Protocol address (IP address) may be assigned to the whole team. This address may be referred to as the team Internet Protocol address (team IP address). Because this Internet Protocol address (team IP address) is independent of any other addresses assigned to any of the components on the network (140), the team IP address may be transferred from one controller (115, 120-1, 120-2, 120-3) to another controller (115, 120-1, 120-2, 120-3). Consequently, if the master controller (115) is unavailable or fails, the team IP address may be transferred to another controller (120-1, 120-2, 120-3) thereby allowing the administrator (105) to gain access to the team once again. In one example, the team IP address may be propagated to each controller (115, 120-1, 120-2, 120-3) after the administrator (105) has assigned a controller (115, 120-1, 120-2, 120-3) to be the master controller (115).

Through the master controller (115), the administrator may both monitor the individual units connected to the controller (115, 120-1, 120-2, 120-3) group as well as configure them as needed. However, as will be discussed later in connection with FIG. 2, failure of the master controller (115) may result in the administrator gaining only monitoring access to the system (100) via an elected controller (FIG. 2, 210-1'); the elected controller (FIG. 2, 210-1') being automatically elected by the system (100) upon the failure of the master controller (115).

Failure of the master controller (115) may be temporary such that the administrator (105) does not have time to address the situation before the master controller (115) comes back online and rejoins the team of controllers (120-1, 120-2, 120-3). When the master controller (115) does fail, one of the other controllers (120-1, 120-2, 120-3) is chosen as an elected master controller. However, when the master controller (115) come back online, the elected master is downgraded or demoted to a slave controller again and the master controller (115) regains the ability for the administrator (105) to configure the controllers.

Additionally, failure of the master controller (115) may prompt the network administrator (105) to investigate the reasons for the failure and address the problem appropriately. If, for example, the administrator (105) determines that the failure of the master controller (115) is temporary, then the administrator (105) may do what is necessary to bring the master controller (115) back online. When the master controller (115) has once again rejoined to the group, the status of the elected master FIG. 2, 210-1') will be downgraded to that of a slave controller (120-1, 120-2, 120-3). Therefore the administrator (105) can, if necessary, continue to configure the team of controllers.

Still further, if, for example, the administrator (105) determines that the failure of the master controller (115) is not temporary, then the administrator (105) may promote the elected controller to be a new master controller (115). With the promotion of the elected controller to be the master controller, the administrator (105) can once again, if necessary, continue to configure the team of controllers. These scenarios therefore prevent two master controllers from being chosen on a single network (140) thereby preventing any split-brain issue that might arise under those conditions.

Figure 2:
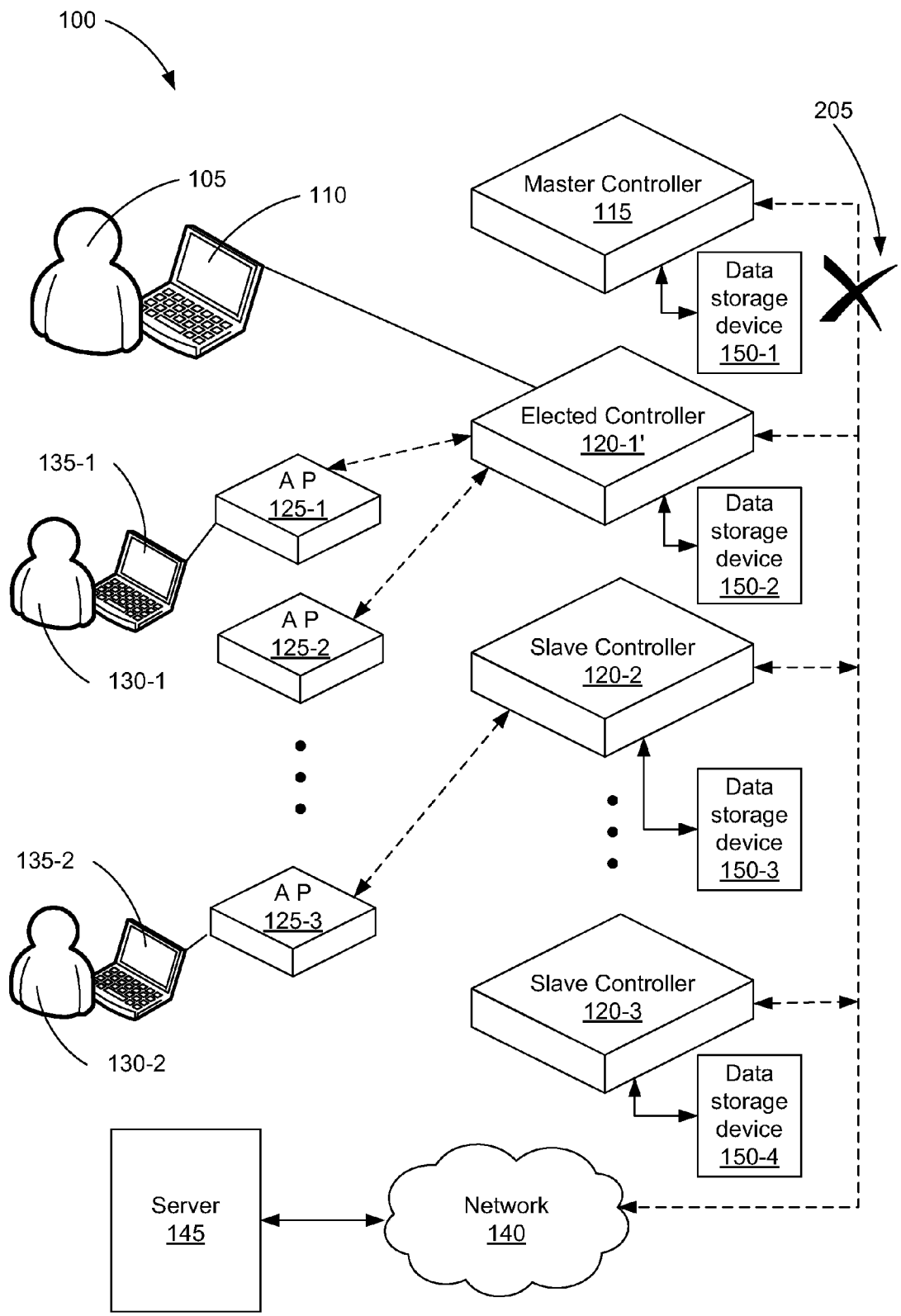
FIG. 2 is a diagram of the illustrative system of FIG. 1, in which the master controller has failed and a slave controller has been promoted as an elected master, according to one example of principles described herein.

FIG. 2 is a diagram of the illustrative system (100) of FIG. 1, in which the master controller (115) has failed (205) and a slave controller (120-1) has been promoted as an elected master (120-1'), according to one example of principles described herein. As mentioned above, failure (205) of the master controller (115) (indicated by an "x" along the network connection between the master controller (115) and the network (140)) may have occurred for a myriad of reasons, examples of which may include operator error and manufacturing defects of the master controller (115). Loss of the master controller (115) results in the promotion of one of the slave controllers (120-1, 120-2, 120-3) to the status of an elected master controller (120-1'). In one example, promotion of a slave controller (120-1, 120-2, 120-3) may be the result of an action taken by the administrator (105) to manually promote the controller (120-1, 120-2, 120-3) via a user computer (110) having either wired or wireless access to the controller (120-1, 120-2, 120-3). In yet another example, promotion of a slave controller (120-1, 120-2, 120-3) may be the result of an automatic election of a slave controller (120-1, 120-2, 120-3) by the team of controllers (120-1, 120-2, 120-3) still operating.

Which slave controller (120-1, 120-2, 120-3) is to be automatically elected by the team of controllers (120-1, 120-2, 120-3), may be determined by the Media Access Control address (MAC address) assigned to each slave controller (120-1, 120-2, 120-3). Therefore, in one example, the controller (120-1, 120-2, 120-3) having the lowest value Media Access Control address (MAC address) will be chosen as the elected master controller (120-1'). In another example, the controller (120-1, 120-2, 120-3) having the highest value Media Access Control address (MAC address) will be chosen as the elected master controller (120-1').

Once the master controller (115) has failed, the administrator (105) may gain access to the team of controllers (120-1, 120-2, 120-3) via either a wired or wireless connection. Additionally, because the team of controllers (115, 120-1, 120-2, 120-3) has a single team IP address associated with them as mentioned previously, the administrator (105) may gain access immediately to an elected master controller (120-1) and monitor or otherwise address any issue with the network (140).

Figure 3:
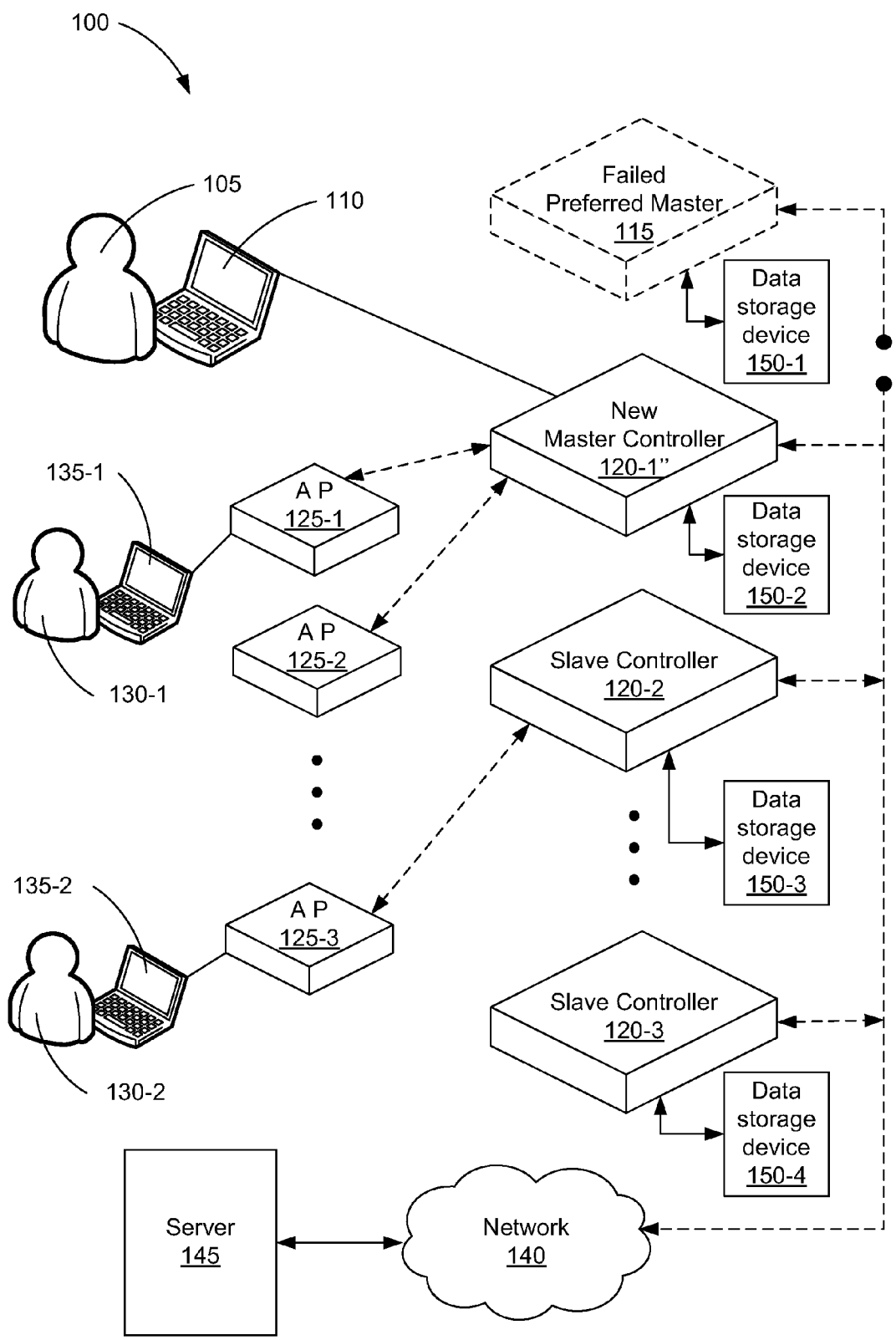
FIG. 3 is a diagram of an illustrative system of FIG. 2, depicting the promotion of an elected controller to a master controller, according to one example of principles described herein.

Turning now to FIG. 3, a diagram of an illustrative system of FIG. 2 is shown, depicting the promotion of an elected controller (FIG. 2, 210-1') to a master controller (120-1"), according to one example of principles described herein. As will be discussed later in connection with FIG. 5, once the administrator (FIG. 1, 105) has gained access to the group of controllers (120-1, 120-2, 120-3) still in operation, the administrator (FIG. 1, 105) may choose whether to promote the elected controller (FIG. 2, 120-1') to be the new master controller (120-1") on the network. Promotion of the elected controller (FIG. 2, 120-1') to the new master controller (120-1") will result in the administrator (FIG. 1, 105) being able to monitor the individual controllers (120-1", 120-2, 120-3) remaining, as well as also propagate new configurations and updates through the system (100) if necessary. The decision to promote the elected controller (FIG. 2, 120-1') to be the new master controller (120-1") may be dependent on the status or future anticipated status of the failed master controller (115).

If, for example, the administrator (105) has determined that the failure of the master controller (115) is temporary, the administrator (105) may then either do nothing and wait until the master controller (115) rejoins the group of controllers (120-1', 120-2, 120-3) or physically access the master controller (115) and attempt to reconnect it to the group. If the master controller (115) rejoins the group of controllers (120-1', 120-2, 120-3), the elected controller (120-1') may be downgraded to the status of a slave controller (FIG. 1, 120-1) while the reconnected master controller (115) takes over the monitoring and configuration of the group of controllers (FIG. 1, 120-1, 120-2, 120-3) as before.

Therefore, the group of controllers (FIG. 1, 120-1, 120-2, 120-3) may have either only one master controller (115) or no master controller (115) having the ability to set configuration settings for the rest of the controllers (FIG. 1, 120-1, 120-2, 120-3). Either promotion of the elected controller (120-1') to a master controller status or rejoining of the master controller (115) to the controller group (FIG. 1, 120-1, 120-2, 120-3), and not both, prevents the system (100) from having two master controllers. This avoids the scenario where the system (100) comprises two master controllers, both of which may set and propagate configuration settings. This in turn prevents a split-brain scenario where configuration settings amongst the individual controllers (FIG. 1, 115, 120-1, 120-2, 120-3) will be in conflict with each other.

Figure 4:
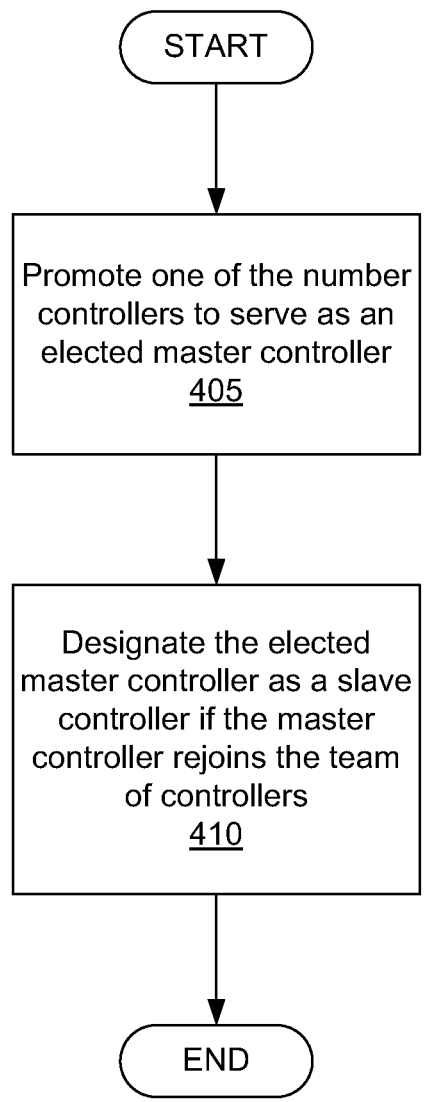
FIG. 4 is a flowchart depicting a method of promoting one controller to be an elected master controller when a master controller has failed, according to one example of principles described herein.

Turning now to FIG. 4, a flowchart depicting a method of promoting (Block 405) one controller to be an elected master controller when a master controller has failed, according to one example of principles described herein is shown. In managing the system (FIG. 1, 100), the administrator (FIG. 1, 105) may team the group of controllers together as discussed earlier. Teaming Teaming of the group of controllers provides for easy access to the controllers (115, 120-1, 120-2, 120-3) by the administrator (FIG. 1, 105). Additionally, because the administrator (FIG. 1, 105) may select one of the controllers in the group as a master controller (FIG. 1, 115), the group of controllers (115, 120-1, 120-2, 120-3) may then be centralized and a single team IP address may be used to address the entire team.

The system (FIG. 1, 100) may further monitor the master controller (FIG. 1, 115) to determine if and when it has failed.

If the master controller (FIG. 1, 115) does fail as has been depicted in FIG. 2, then one of the slave controllers (FIG. 1, 120-1, 120-2, 120-3) is promoted (Block 405) to be the elected master controller (FIG. 2, 120-1'). As previously discussed, this may be accomplished automatically by the team of controllers (FIG. 1, 120-1, 120-2, 120-3). Specifically, each controller (115, 120-1, 120-2, 120-3) has a Media Access Control address (MAC address) assigned to each of them. As a result, in one example, the controllers (FIG. 1, 120-1, 120-2, 120-3) within the team may choose amongst themselves which controller (FIG. 1, 120-1, 120-2, 120-3) has the lowest valued number Media Access Control address (MAC address) assigned to it and automatically promote that controller (FIG. 1, 120-1, 120-2, 120-3) to be the elected master controller (FIG. 2, 120-1').

In another example, the controllers (FIG. 1, 120-1, 120-2, 120-3) within the team may choose amongst themselves which controller (FIG. 1, 120-1, 120-2, 120-3) has the highest valued number Media Access Control address (MAC address) assigned to it. The controller (FIG. 1, 120-1, 120-2, 120-3) having the highest valued number Media Access Control address (MAC address) is then automatically promoted (Block 405) to be the elected master controller (FIG. 2, 120-1').

Once the elected master has been promoted (Block 405), without intervention from the network administrator (FIG. 1, 105) the master controller (FIG. 2, 115) may come back online and rejoin the team of controllers (FIG. 1, 120-1, 120-2, 120-3). When this occurs, the elected master (FIG. 2, 120-1') is downgraded or demoted to a slave controller (FIG. 1, 120-1, 120-2, 120-3) and the master controller (FIG. 1, 115) continues to operated a described above.

Figure 5:
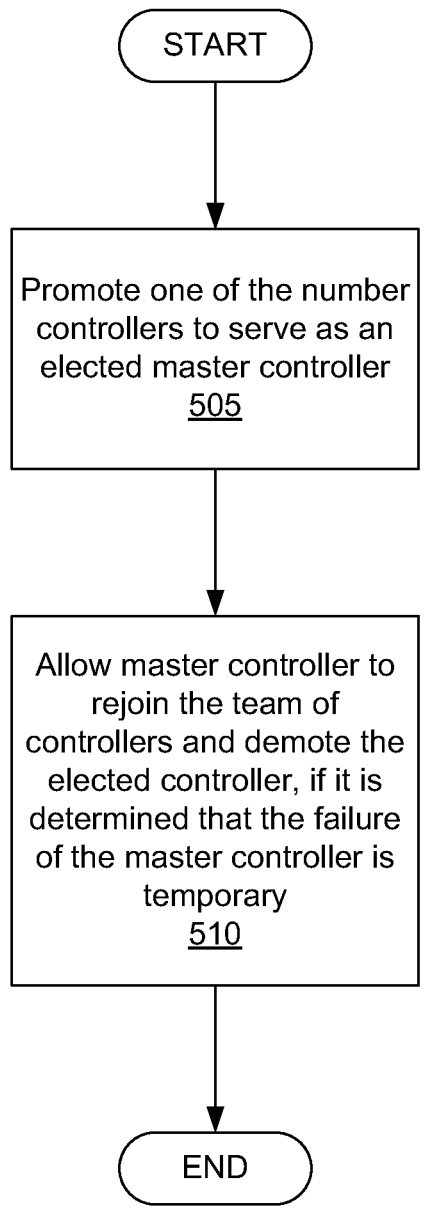
FIG. 5 is a flowchart showing a method of configuring a group of controllers within a network, electing one controller to be an elected master controller when a master controller has failed and promoting the elected master controller to a master controller, according to another example of principles described herein.

Turning to FIG. 5, a flowchart depicting a method of promoting (Block 505) one controller to be an elected master controller when a master controller has failed, according to another example of principles described herein is shown. In FIG. 5, a network administrator (FIG. 1, 105) may intervene and determine if the failure of the master controller (FIG. 1, 115) is temporary or not. If the network administrator (FIG. 1, 105) determines that the failure of the master controller (FIG. 1, 115) is temporary, he or she may do nothing and wait until the master controller (FIG. 1, 115) rejoins the group. When the master controller (FIG. 1, 115) rejoins the group, the elected master controller (FIG. 2, 120-1') is demoted or downgraded (Block 510) to a slave controller (FIG. 1, 120-1, 120-2, 120-3) and the master controller (FIG. 1, 115) continues to operated a described above.

Figure 6:
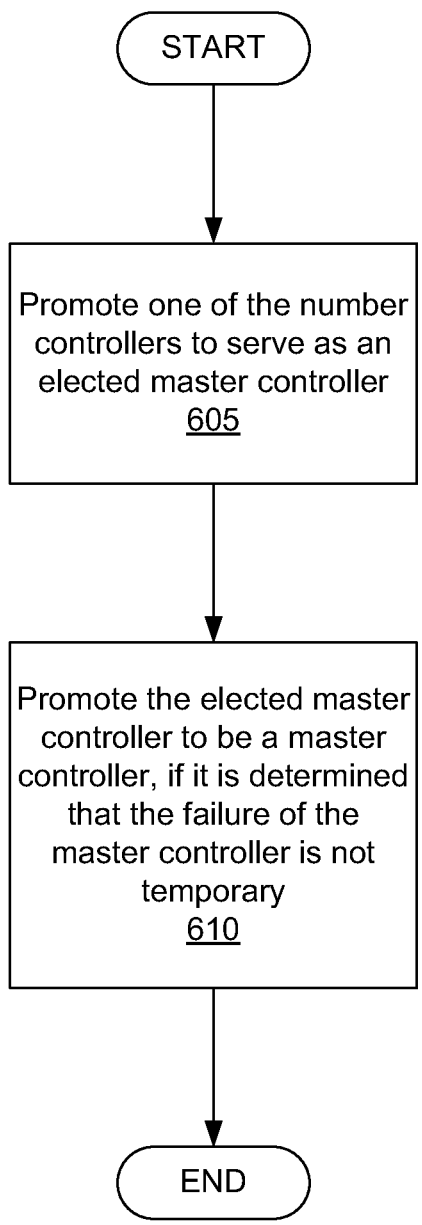
FIG. 6 is a flowchart depicting a method of promoting one controller to be an elected master controller when a master controller has failed, according to another example of principles described herein.

FIG. 6 is a flowchart depicting a method of promoting (Block 605) one controller to be an elected master controller when a master controller has failed, according to another example of principles described herein is shown. In FIG. 6, a network administrator (FIG. 1, 105) may intervene and determine if the failure of the master controller (FIG. 1, 115) is temporary or not. If the network administrator (FIG. 1, 105) determines that the failure of the master controller (FIG. 1, 115) is not temporary, then the administrator may promote (Block 410) the elected master controller (FIG. 2, 120-1') as a master controller (FIG. 3, 120-1") by accessing the elected master controller (FIG. 2, 120-1') and designating it as such.

Because configuration in FIGS. 1, 2, 3, 4, 5, and 6 is only performed with a master controller (FIG. 1, 115; FIG. 3, 120-1) and not with an elected master (FIG. 2, 120-1'), the prevention of a scenario where two masters are present on the network (FIG. 1, 140) may avoid many issues. Some of these issues may include, for example, synchronization issues such as split brain as well as possible loss of changes due to intermittent network failures. Implementation of this method therefore assures that there will always be a single controller (FIG. 1, 115, 120-1, 120-2, 120-3) responsible for configuration within the network.

Figure 7:
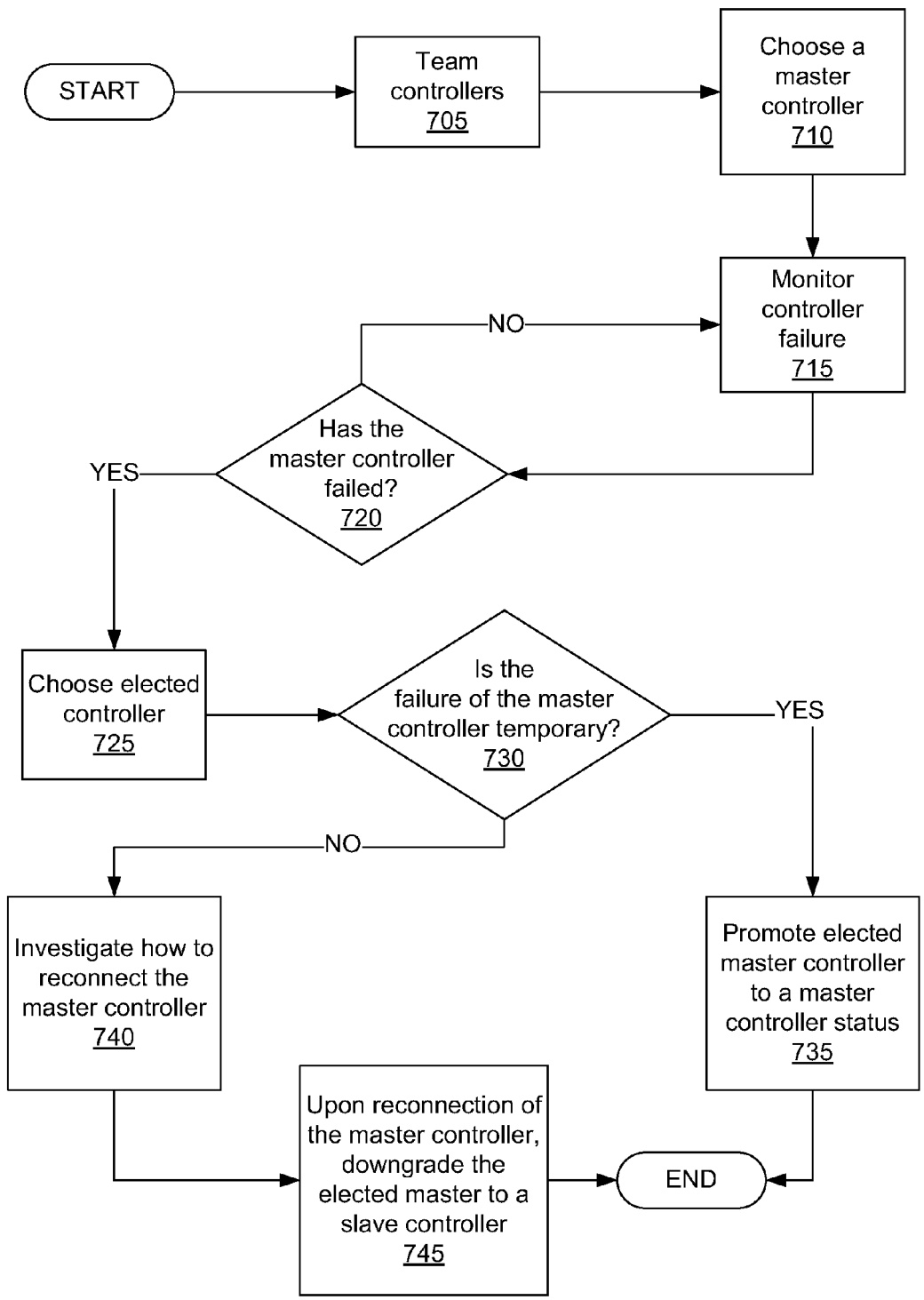
FIG. 7 is a flowchart showing a method of configuring a group of controllers, electing one controller to be an elected master controller when a master controller has failed, and promoting the elected master controller to a master controller, according to another example of principles described herein.

Turning now to FIG. 7 a flowchart showing a method of configuring a group of controllers (FIG. 1, 115, 120-1, 120-2, 120-3) within a network (FIG. 1, 140), electing one controller (FIG. 1, 115, 120-1, 120-2, 120-3) to be an elected master controller (FIG. 2, 120-1') when a master controller (FIG. 1, 115) has failed, and promoting the elected master controller (FIG. 2, 120-1') to a master controller (FIG. 3, 120-1"), according to one example of principles described herein is shown. In managing the system (FIG. 1, 100), the administrator (FIG. 1, 105) may first team the group of controllers (FIG. 1, 115, 120-1, 120-2, 120-3) together (Block 705) as discussed earlier. Teaming of the group of controllers (FIG. 1, 115, 120-1, 120-2, 120-3) provides for easy access to the controllers (115, 120-1, 120-2, 120-3) by the administrator (FIG. 1, 105). Additionally, because the administrator (FIG. 1, 105) selects (Block 710) a master controller (FIG. 1, 115) out of the group of controllers (FIG. 1, 115, 120-1, 120-2, 120-3), the group of controllers (115, 120-1, 120-2, 120-3) may then be centralized and a single team IP address may be used to address the entire team.

During operation, the administrator (FIG. 1, 105) may need to update firmware and configuration settings on the individual controllers (115, 120-1, 120-2, 120-3). To accomplish this, the administrator (FIG. 1, 105) accesses the master controller (FIG. 1, 115) and updates that controller (FIG. 1, 115) as appropriate. The master controller (FIG. 1, 115) will then propagate (Block 715) or push those settings and updates to each controller (115, 120-1, 120-2, 120-3) in the group as well as any access points (125-1, 125-2, 125-3) that may be connected to individual controllers (115, 120-1, 120-2, 120-3).

After the individual controllers (115, 120-1, 120-2, 120-3) have been grouped (Block 705) and a master controller (FIG. 1, 115) has been selected (Block 710), the system (FIG. 1, 100) may automatically monitor (Block 715) each controllers (FIG. 1, 115, 120-1, 120-2, 120-3) for any failures that may occur. When a slave controller (FIG. 1, 120-1, 120-2, 120-3) fails, the system may notify the administrator (FIG. 1, 105) of the failure and inform the administrator (FIG. 1, 105) that action may need to be taken. The administrator (FIG. 1, 105) may then address the problem of a failing or failed slave controller (FIG. 1, 120-1, 120-2, 120-3) by either replacing that slave controller (FIG. 1, 120-1, 120-2, 120-3) or monitoring the failed slave controller (FIG. 1, 120-1, 120-2, 120-3) to determine whether it will come back online and join the team of controllers (115, 120-1, 120-2, 120-3) again.

The system (FIG. 1, 100) may also monitor (Block 715) the master controller (FIG. 1, 115) to determine if it has failed. The system (FIG. 1, 100), therefore, may constantly determine whether the master controller (FIG. 1, 115) has failed (Block 720). If it has not (Block 720, Determination No), then the system may continue to monitor (Block 715) the master controller (FIG. 1, 115) until it does fail.

If the master controller (FIG. 1, 115) does fail (Block 720, Determination Yes), as has been depicted in FIG. 2, then one of the slave controllers (FIG. 1, 120-1, 120-2, 120-3) is chosen (Block 725) and promoted to an elected master controller (FIG. 2, 120-1') status. As previously discussed, this may be accomplished automatically by the team of controllers (FIG. 1, 120-1, 120-2, 120-3). Specifically, each controller (115, 120-1, 120-2, 120-3) has a Media Access Control address (MAC address) assigned to each of them. As a result, in one example, the controllers (FIG. 1, 120-1, 120-2, 120-3) within the team may choose (Block 725) amongst themselves which controller (FIG. 1, 120-1, 120-2, 120-3) has the lowest valued number Media Access Control address (MAC address) assigned to it and automatically promote that controller (FIG. 1, 120-1, 120-2, 120-3) to the elected master controller (FIG. 2, 120-1'). In another example, he controllers (FIG. 1, 120-1, 120-2, 120-3) within the team may choose (Block 725) amongst themselves which controller (FIG. 1, 120-1, 120-2, 120-3) has the highest valued number Media Access Control address (MAC address) assigned to it and automatically promote that controller (FIG. 1, 120-1, 120-2, 120-3) to the elected master controller (FIG. 2, 120-1').

Upon promotion (Block 725) of one of the operating controllers (FIG. 1, 120-1, 120-2, 120-3) to be the elected master controller (FIG. 2, 120-1'), the system may then send an alert to the administrator (FIG. 1, 105) instructing the administrator (FIG. 1, 105) that the system (FIG. 1, 100) requires attention due to the fact that the master controller (FIG. 1, 115) has failed. The administrator (FIG. 2, 105) need not reconfigure any of the controllers (FIG. 2, 120-1', 12b, 120-3) due to the elected master controller (120-1') comprising the same configuration settings as those which the master controller (115) comprised and had propagated to the other controllers (FIG. 1, 120-1, 120-2, 120-3). The administrator (FIG. 2, 105) may only be allowed to monitor the network, controllers (FIG. 2, 120-2, 120-3), and access points (FIG. 2, 125-1, 125-2, 125-3) through the elected master (FIG. 2, 120-1') to determine how best to deal with the failure of the master controller (FIG. 2, 115). The elected master (FIG. 2, 120-1') therefore prevents that administrator from configuring any controller (FIG. 1, 120-1, 120-2, 120-3) within the group in case the master controller (115) come back online and rejoins the group.

The administrator (FIG. 2, 105) may specifically address the failure of the master controller (FIG. 2, 115) appropriately by determining (Block 730) whether the failure of the master controller (FIG. 2, 115) is temporary. If the administrator (FIG. 2, 105) determines that the failure of the master controller (FIG. 2, 115) is temporary (Block 730, Determination No), the administrator (FIG. 2, 105) may investigate (Block 740) how to reconnect the master controller (FIG. 2, 115). In one example, the administrator (FIG. 2, 105) may simply wait for the master controller (FIG. 2, 115) to rejoin the group of operating controllers (FIG. 1, 120-1, 120-2, 120-3). In this example, the administrator can access the group of controllers (FIG. 1, 120-1, 120-2, 120-3) via the elected master controller (FIG. 2, 120-1') and monitor when the master controller (FIG. 1, 115) joins the group. If the master controller (FIG. 1, 115) rejoins the group, the system does not require interaction with the administrator (FIG. 1, 115) and further prevents configuration changes to be made within the group of controllers (FIG. 1, 120-1, 120-2, 120-3) while an elected master controller is operating.

In another example, the administrator (FIG. 2, 105) may physically access the hardware associated with the master controller (FIG. 2, 115) to determine what is to be done to render it operational again.

Once the master controller (FIG. 1, 115) has reestablished connection with the rest of the controllers (FIG. 1, 120-1, 120-2, 120-3) the elected master controller (FIG. 2, 120-1') may be downgraded or demoted (Block 745) to the status of a slave controller (FIG. 1, 120-1, 120-2, 120-3) and the master controller (FIG. 1, 115) may take over monitoring the system and the administrator may once again set configuration settings and have them propagated throughout the number of controllers (FIG. 1, 120-1, 120-2, 120-3).

If, however, the administrator (FIG. 2, 105) determines that the failure of the master controller (FIG. 2, 115) is permanent (Block 730, Determination Yes), the administrator (FIG. 2, 105) may then take action and promote (Block 735) the elected master controller (FIG. 2, 120-1') as the new master controller (120-1") as depicted in FIG. 3. Through this method, the administrator (FIG. 3, 105) may be certain that there is never more than one master controller (FIG. 1, 115; FIG. 3, 120-1) in operation within the system (FIG. 1, 100). Additionally, promotion of the elected master controller (FIG. 2, 120-1') to a master controller (120-1") status gives the administrator (FIG. 3, 105) the ability to monitor the network as well as the ability to once again propagate updates and configurations to all other controllers (120-2, 120-3) and access points (FIG. 3, 125-1, 125-2, 125-3).

Because configuration is to be done through a master controller (FIG. 1, 115; FIG. 3, 120-1) and because the master controller (FIG. 1, 115; FIG. 3, 120-1") pushes configuration and updates out to the other controllers (FIG. 1, 120-1, 120-2, 120-3) in the group, many issues may be avoided. Some of these issues may include, for example, synchronization issues such as split brain and possible loss of changes due to intermittent network failures. In this way, there will always be a single controller (FIG. 1, 115, 120-1, 120-2, 120-3) responsible for configuration within the network.

The principles, methods and embodiments described above may also be accomplished by a computer program product comprising a computer readable storage medium having computer usable program code embodied therewith that, when executed by a processor, performs the above methods. Specifically, computer usable program code may be used by a processor to team a group of controllers (FIG. 1, 115, 120-1, 120-2, 120-3) together and promote one of the controllers to a master controller (FIG. 1, 115). The computer usable program code may further be used by a processor to propagate configuration data to the group of controllers via the master controller (FIG. 1, 115). Still further, the computer usable program code may be used by a processor to, upon failure of the master controller (FIG. 2, 115) promote an elected controller (FIG. 2, 120-1') form the group of controllers (FIG. 1, 120-1, 120-2, 120-3). Even further, the computer usable program code may be used by a processor to promote an elected master controller (FIG. 2, 120-1') to a new master controller (FIG. 2, 120-1").

The preceding description has been presented only to illustrate and describe embodiments and examples of the principles described. This description is not intended to be exhaustive or to limit these principles to any precise form disclosed. Many modifications and variations are possible in light of the above teaching.

What is claimed is:

1. A method of controller election comprising:
   in a team of a number of controllers comprising a master controller, and a number of slave controllers, providing to an administrator access to monitor and configure the team of controllers through the master controller;
   determining that the master controller has failed; and
   in response to the determining, automatically promoting another controller of the team of controllers to serve as an elected master controller, and not providing to the administrator access to configure the team of controllers through the elected master controller until the master controller is determined to have permanently failed, and
   wherein each of the controllers in the team of controllers comprises a device that configures and manages an access point (AP) in a network.

2. The method of claim 1, further comprising:
   determining that the master controller has rejoined the team of controllers; and without administrator intervention, designating the elected master controller as a slave controller.

3. The method of claim 1, further comprising:
    determining that the failure of the master controller is temporary; and
    designating the elected master controller as a slave controller in response to the determination that the failure of the master controller is temporary.

4. The method of claim 1, further comprising, propagating, by the master controller, configuration data throughout the team of controllers, wherein each of the controllers in the team of controllers further performs automatic adjustments to at least one of radio frequency power, channels, authentication, and security on the APs.

5. The method of claim 4, further comprising, propagating, by the master controller, configuration data throughout the team of controllers using simple object access protocol (SOAP).

6. The method of claim 1, wherein the team of controllers as a whole is assigned a single IP address, and wherein the method further comprises propagating the single team IP address to the team of controllers following the automatic promotion of the another controller to serve as the elected master controller.

7. The method of claim 6, further comprising providing access to the team of controllers by the administrator via the single team IP address.

8. The method of claim 1, wherein automatically promoting another controller of the team of controllers to serve as the elected master controller further comprises automatically promoting another controller of the team of controllers based on relative values of a media access control (MAC) address for each of the controllers within the team of controllers.

9. A system comprising:
    a number of controllers grouped as a team, the team comprising a master controller and a number of slave controllers, wherein each of the controllers in the team of controllers comprises a device that configures and manages an access point (AP) in a network, and wherein the master controller is to provide to an administrator access to monitor and configure the team of controllers through the master controller;
    wherein, in response to a determination that the master controller has failed, another of the controllers in the team is automatically promoted to serve as an elected master controller, wherein the elected master controller does not provide to the administrator access to configure the team of controllers until the master controller is determined to have permanently failed.

10. The system of claim 9, wherein, in response to a determination that the failed master controller has rejoined the team of controllers, the elected master controller is designated as a slave controller without administrator intervention.

11. The system of claim 9, wherein the master controller propagates configuration data throughout the team of controllers, wherein each of the controllers in the team of controllers further performs automatic adjustments to at least one of radio frequency power, channels, authentication, and security on the APs.

12. The system of claim 11, wherein the master controller propagates configuration data throughout the group of controllers using simple object access protocol (SOAP).

13. The system of claim 9, wherein the team of controllers as a whole is assigned a single IP address.

14. The system of claim 13, wherein a network administrator is provided with access to the team of controllers via the single team IP address, and wherein the single team IP address is propagated to the team of controllers following automatic promotion of the another controller to serve as the elected master controller.

15. The system of claim 9, wherein the elected master controller is selected based on relative values of media access control (MAC) addresses of the controllers available to serve as the elected master controller.

16. A non-transitory computer readable storage medium having computer usable program code embodied therewith, the computer usable program code, when executed by a processor of a controller, of a team of controllers, programmed to perform automatic adjustments to at least one of radio frequency power, channels, authentication, and security on a network access point, causes that processor to:
    provide to an administrator access to monitor and configure the controller through a master controller;
    determine a failure of a master controller;
    promote the controller to serve as an elected master controller in response to the determination that the master controller has failed, wherein the elected master controller does not provide to the administrator access to configure the team of controllers until the master controller is determined to have permanently failed.

17. The non-transitory computer readable storage medium of claim 16, wherein the computer usable program code is further to cause the processor to, in response to a determination that the master controller has rejoined the team of controllers, without administrator intervention, designate the controller as a slave controller.

* * * * *